US011457564B2

(12) United States Patent
DeChristopher

(10) Patent No.: US 11,457,564 B2
(45) Date of Patent: Oct. 4, 2022

(54) TORSIONAL STIFFNESS TRANSFER MECHANISM FOR A HINGED HARVESTER HEAD

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 494 days.

(21) Appl. No.: 16/691,977

(22) Filed: Nov. 22, 2019

(65) Prior Publication Data
US 2021/0153436 A1 May 27, 2021

(51) Int. Cl.
*A01D 41/14* (2006.01)
*A01B 63/02* (2006.01)
*A01B 63/00* (2006.01)
*A01D 41/06* (2006.01)
*A01D 41/04* (2006.01)

(52) U.S. Cl.
CPC .......... *A01D 41/144* (2013.01); *A01B 63/002* (2013.01); *A01B 63/02* (2013.01); *A01D 41/04* (2013.01); *A01D 41/06* (2013.01)

(58) Field of Classification Search
CPC ...... A01D 41/144; A01D 41/04; A01D 41/06; A01B 63/002; A01B 63/02
See application file for complete search history.

(56) References Cited

U.S. PATENT DOCUMENTS

| 5,673,543 | A | * | 10/1997 | Richardson et al. ....................... A01D 41/144 56/85 |
| 6,272,823 | B1 | | 8/2001 | Yeomens |
| 6,675,568 | B2 | | 1/2004 | Patterson et al. |
| 9,148,999 | B2 | | 10/2015 | Fuechtling |
| 9,198,353 | B2 | * | 12/2015 | Ritter et al. ......... A01D 45/021 |
| 9,198,355 | B2 | * | 12/2015 | Heim et al. .......... A01D 45/021 |
| 2010/0083629 | A1 | | 4/2010 | Klotzbach et al. |
| 2019/0335663 | A1 | * | 11/2019 | Capello ................ A01D 41/144 |

FOREIGN PATENT DOCUMENTS

EP 2732689 A1 5/2014

* cited by examiner

*Primary Examiner* — Tara Mayo-Pinnock
(74) *Attorney, Agent, or Firm* — Peter Zacharias; Patrick Sheldrake

(57) ABSTRACT

An agricultural vehicle header having a center section, a wing section, a hinge connecting the center section's lower frame to the wing section's lower frame, and a torque transfer linkage connecting the center section's upper frame to the wing section's upper frame. The torque transfer link has a first link, a second link, a first pivot connection joining the first link to the center section upper frame, and providing a respective single degree of rotational freedom between the first link and the center section upper frame, a second pivot connection joining the first link to the second link, and providing a respective single degree of rotational freedom between the first link and the second link, and a third pivot connection joining the second link to the first wing section upper frame, and providing a respective single degree of rotational freedom between the second link and the first wing section frame.

19 Claims, 3 Drawing Sheets

TORSIONAL STIFFNESS TRANSFER MECHANISM FOR A HINGED HARVESTER HEAD

BACKGROUND OF THE INVENTION

Agricultural equipment, such as combines, swathers and windrowers, typically include a header that is movably attached to the chassis of the vehicle. During operation, the header might be raised or lowered to account for variations in the ground level, properties of the particular crop being harvested, and various other operating conditions. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

Headers are often designed to follow the contours of the crop field to cut the crops at a uniform height across the width of the header. To this end, the cutter bar of the header may be mounted on flexible forward-extending arms that allow the cutter bar to raise and lower according to the local ground level. Furthermore, in multi-segment headers, the wing sections are able to pivot up and down relative to the center section to obtain even more ground-following capability.

While ground-following is desirable, relatively wide harvester headers, particularly multi-segment headers, can experience significant deflection due to the weight of the header. This deflection can potentially impair proper operation of the header during transport by allowing the ends of the header to droop closer to nearby objects. Such deflection can also affect harvesting performance by allowing more plant material to enter the header at the ends, leading to unnecessary power consumption, and by rotating forward to increase the likelihood of plowing dirt. Furthermore, if it is necessary to raise the center section to prevent the ends from drooping too far, the center section may not be vertically situated to harvest all of the crop. This deflection is also sometimes perceived as giving an undesirable appearance to the header, which can lead to customer dissatisfaction or rejection of the header in favor of other options, even if the deflection has minimal effect on the header's performance.

Header deflection can be reduced by making the parts stiffer, but this can lead to excessive weight. Thus, header design requires an optimization of stiffness and weight. It has been found that this optimization is even more difficult in multi-segment headers, which typically have a single hinge connection joining the center section to the wing sections. The hinge can be reinforced to help prevent deflection, but doing so is likely to require the hinge to become excessively robust to obtain even minor improvements. Thus, there remains a need to advance the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural vehicle header having a center section having a center section upper frame and a center section lower frame, a first wing section having a first wing section upper frame and a first wing section lower frame, a first hinge connecting the center section lower frame to the first wing section lower frame, and a first torque transfer linkage connecting the center section upper frame to the first wing section upper frame. The first torque transfer link has a first link, a second link, a first pivot connection joining the first link to the center section upper frame, and providing a respective single degree of rotational freedom between the first link and the center section upper frame, a second pivot connection joining the first link to the second link, and providing a respective single degree of rotational freedom between the first link and the second link, and a third pivot connection joining the second link to the first wing section upper frame, and providing a respective single degree of rotational freedom between the second link and the first wing section frame.

In some exemplary aspects, one or more of the first pivot connection, the second pivot connection and the third pivot connection comprises a double-shear pivot connection.

In some exemplary aspects, the first pivot connection, the second pivot connection and the third pivot connection all comprise respective double-shear pivot connections.

In some exemplary aspects, the second pivot connection is positioned lower than the first pivot connection and the third pivot connection when the header is configured for use.

In some exemplary aspects, the first hinge is configured to allow the first wing section to rotate relative to the center section about a pivot axis, and the respective single degrees of rotational freedom of the first pivot connection, the second pivot connection and the third pivot connection are parallel with the pivot axis.

In some exemplary aspects, the first link comprises: a first link arm extending from the first pivot connection to the second pivot connection, a second link arm extending from the first pivot connection to the second pivot connection, the second link arm being spaced from the first link arm, and a link body joining the first link arm to the second link arm.

In some exemplary aspects, the first link comprises a first clevis at the first pivot connection, and a second clevis at the second pivot connection, and the second link comprises a third clevis at the third pivot connection.

In some exemplary aspects, the second link comprises a clevis at the second pivot connection.

In some exemplary aspects, the header further includes: a second wing section having a second wing section upper frame and a second wing section lower frame, a second hinge connecting the center section lower frame to the second wing section lower frame, and a second torque transfer linkage connecting the center section upper frame to the second wing section upper frame. The second torque transfer link has a respective first link, a respective second link, a respective first pivot connection joining the respective first link to the center section upper frame, and providing a respective single degree of rotational freedom between the first link and the center section upper frame, a respective second pivot connection joining the respective first link to the respective second link, and providing a respective single degree of rotational freedom between the respective first link and the respective second link, and a respective third pivot connection joining the respective second link to the second wing section upper frame, and providing a respective single degree of rotational freedom between the respective second link and the second wing section frame.

In any of the foregoing embodiments, the header may be part of an agricultural vehicle having a chassis configured for movement on a surface. The vehicle may include a threshing and separating system mounted to the chassis, and the center section may be operatively connected to the threshing and separating system by a feeder housing.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide apparatus for improving the torsional stiffness of multi-segment headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
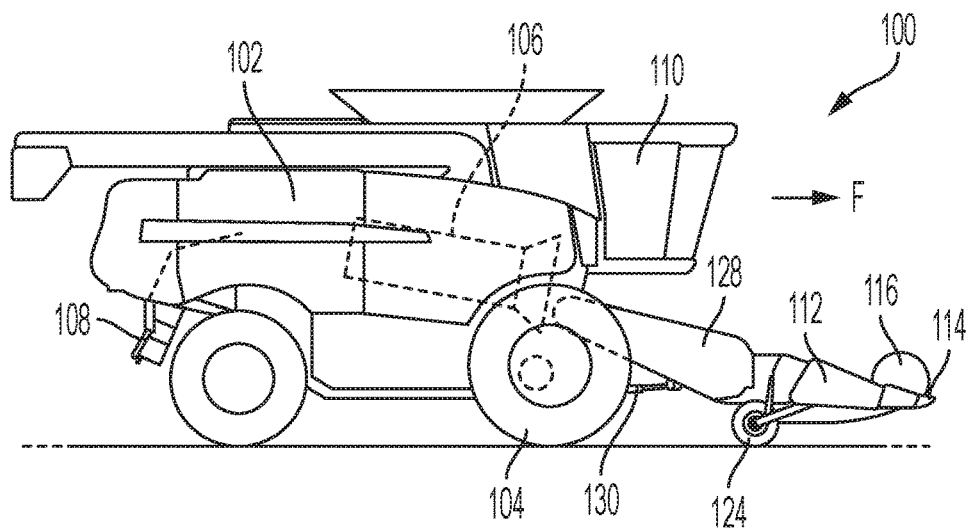
FIG. 1 is a side view of an agricultural vehicle that may include embodiments of the present invention.

FIG. 1 illustrates an example of an agricultural combine 100 with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, an operator cab 110, and so on.

Figure 2:
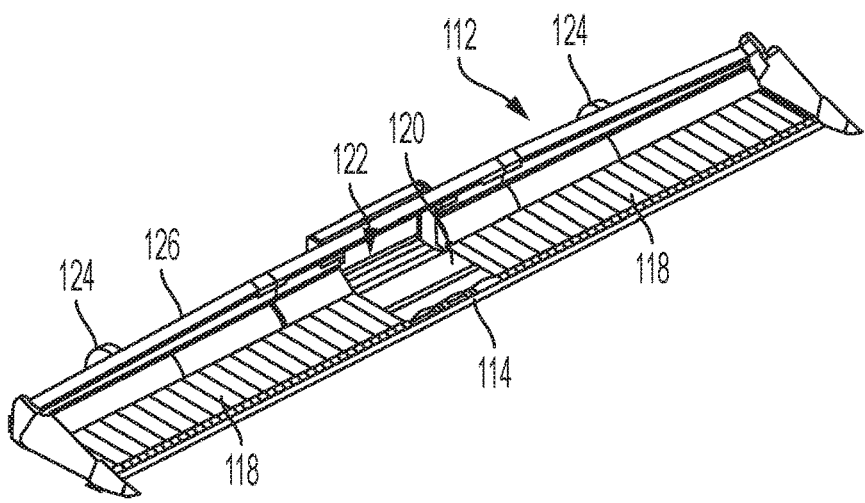
FIG. 2 is an isometric view of a prior art header.

Referring also to FIG. 2, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more actuators 130 to change the position of the header 112 relative to the ground.

Figure 3:
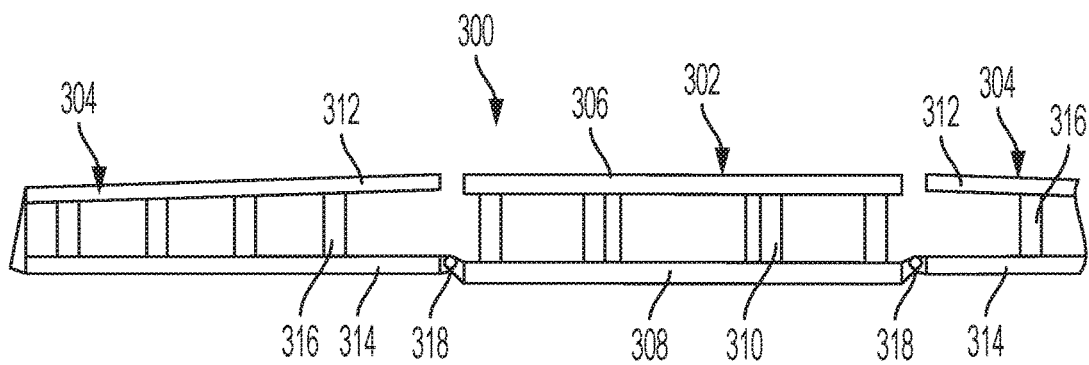
FIG. 3 is a front schematic view of a prior art header.

FIG. 3 illustrates the construction of a conventional multi-segment, or "articulated," header 300 having a center section 302 that extends laterally from a first end to a second end, and left and right wing sections 304 extending laterally away from the center section 302 from respective ends of the center section 302. The term "lateral" will be understood to mean a direction that is transverse to the forward drive direction F. The header 300 typically is mounted to a forward end of the chassis 102, such as shown in FIG. 1, but it may be mounted elsewhere (e.g., at the rear or at some intermediate location under the chassis 102). The shown example has two wing sections 304, but other embodiments may have a single wing section 304.

The center section 302 is constructed on a frame assembly having an upper frame 306 and a lower frame 308. The upper frame 306 and lower frame 308 may be connected by frame uprights 310 or the like to form the frame assembly. Similarly, each wing section 304 is constructed on a frame assembly having an upper frame 312 and a lower frame 314, with uprights 316 therebetween.

Each wing section 304 is movably mounted to the center section 302 by a respective hinge 318. The hinges 318 extend generally in the forward direction F, but the particular orientation can change depending on the orientation of the header 112 relative to the chassis 102. This type of prior art multi-segment header is subject to relatively significant deflection. In particular, the weight of the wing sections 304 and the center section 302 cause the lateral ends of the wing sections 304 to droop towards the ground. Furthermore, the center of gravity of the center section 302 and wing sections 304 is located forward of the main structural body of the frame, and thus the center section 302 and wing sections 304 also droop down in the forward direction. The forward droop at the ends of the wing sections 304 is particularly exacerbated by the hinges 318, which are unable to transmit the torsional stiffness of the upper frames of the wing and center sections. The discontinuity in torsional stiffness at the hinges 318 manifests as a relatively sudden increase in forward droop at the inboard ends of the wing sections.

Figure 4:
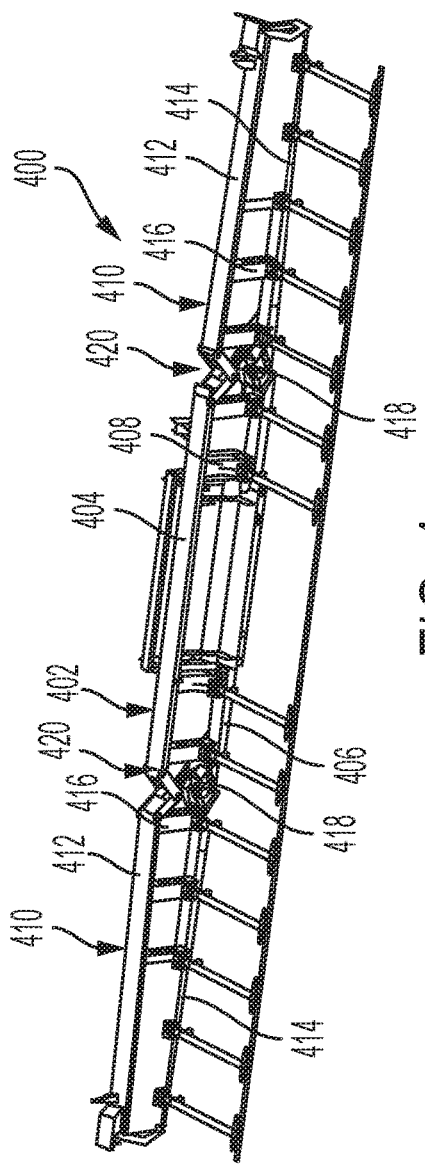
FIG. 4 is an isometric view of a first exemplary embodiment of a header.
Figure 6:
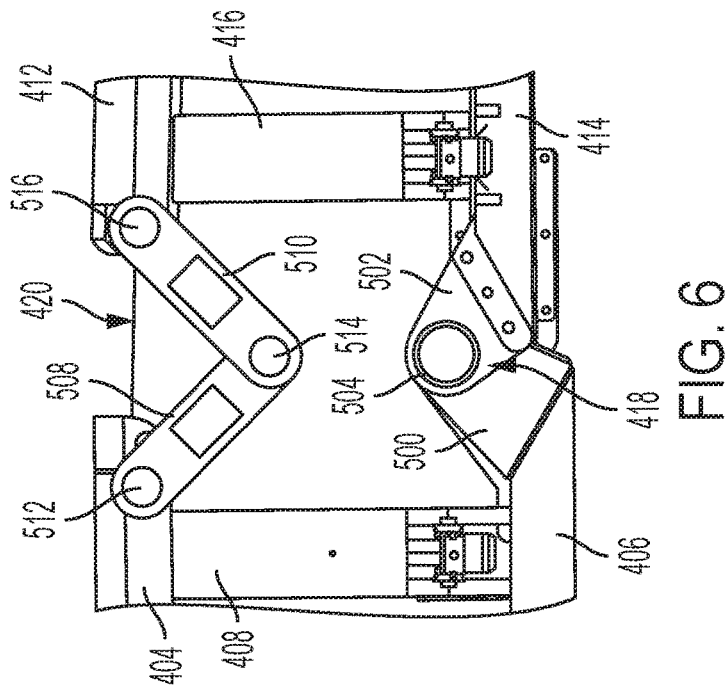
FIG. 6 is front elevation view showing the connection between the center section and a wing section of the header of FIG. 4.
Figure 5:
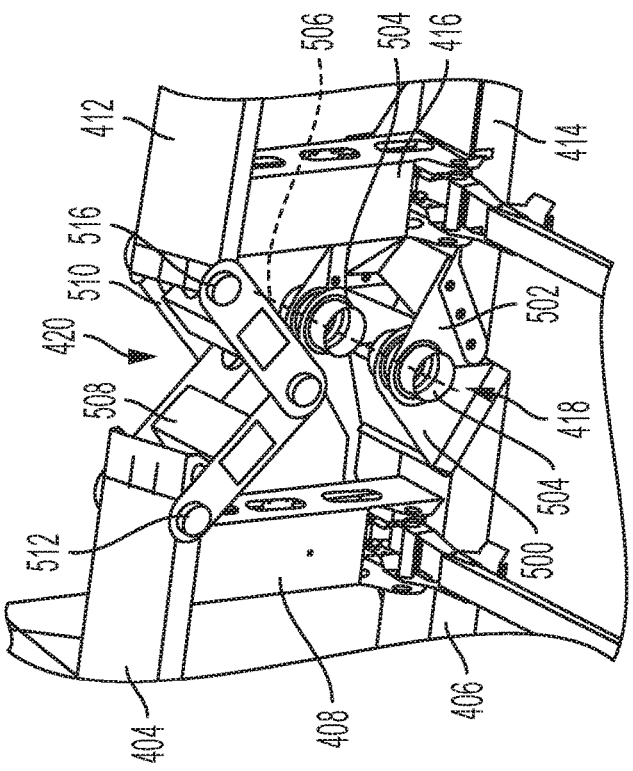
FIG. 5 is an isometric view showing a connection between the center section and a wing section of the header of FIG. 4.

The inventor has determined that the total amount of droop at the wing sections can be reduced by providing an additional torque transfer mechanism at the hinge locations. FIGS. 4-6 show an example of such a mechanism.

FIG. 4 shows a multi-segment header 400 with various parts removed to show the main structural components. The header 400 has a center section 402 having a center section upper frame 404 and a center section lower frame 406. The center section upper frame 404 and lower frame 406 are illustrated as beams that are spaced apart in the vertical direction and joined by uprights 408. The upper frame 404 and lower frame 406 may also be joined by stressed panels, diagonal braces, and other structural components. It will also be appreciated that the upper frame 404 and lower frame 406 may comprise portions of a unitary structure, such as a single large extrusion, casting, a monocoque-type construction of stamped and welded parts, or the like.

A wing section 410 is attached at each end of the center section 402, but other embodiments may include a single wing section 410 attached at one end of the center section 402. Each wing section has a wing section upper frame 412 and a wing section lower frame 414. As with the center section, the wing section upper frame 412 and lower frame 414 may be separate beams that are joined by uprights 416, panels, diagonal braces, or the like. The wing section upper frame 412 and lower frame 414 also may comprise portions of a single extrusion, casting, unitary monocoque-type assembly, or the like.

A hinge 418 connects the lower frame 414 of each wing section 410 to the lower frame 406 of the center section 402. The hinges 418 may comprise any suitable pivoting connector, such as a pin or the like. For example, as best shown in FIG. 5, the center section lower frame 406 may have a first clevis 500 formed by spaced plates having aligned circular openings, and the wing section lower frame 414 may have a second clevis 502 formed by spaced plates having aligned circular openings, and one or more pins 504 may be inserted through the clevis openings to form a pivoting hinge 418. Each hinge 418 is configured to allow the respective wing section 410 to pivot relative to the center section 402 about a respective pivot axis 506. The hinges 418 may define respective pivot axes 506 that are parallel to each other, but this is not strictly required. The pivot axis 506 is oriented generally in the forward direction F, but the exact orientation will change as the header 400 is moved relative to the combine chassis 102.

A torque transfer linkage 420 connects the center section upper frame 404 to each wing section upper frame 412. The torque transfer linkage 420 includes a first link 508, a second link 510, a first pivot connection 512 joining the first link 508 to the center section upper frame 404, a second pivot connection 514 joining the first link 508 to the second link 510, and a third pivot connection 516 joining the second link 510 to the wing section upper frame 412. Each pivot connection 512, 514, 516 provides a single degree of rotational freedom between the joined parts. Thus, the first link 508 is constrained to pivot about a single axis relative to the center section upper frame 404 at the first pivot connection 512. Similarly, the second link 510 is constrained to pivot about a single axis relative to the wing section upper frame 412 at the third pivot connection 516. The second pivot connection 514 allows the first link 508 and second link 510 to pivot relative to one another about a single axis at the second pivot connection 514. Each pivot connection 512, 514, 516 may comprise any suitable configuration of pins, bores, bearings, bushings, or the like.

As shown in FIGS. 4-6, the first link 508 and second link 510 are angled relative to one another when the wing section 410 is in an intermediate position (i.e., between the fully-lowered and fully-raised use positions). Thus, the torque transfer linkage 420 is able to collapse and extend to allow the wing section 410 to pivot about the hinge 418. The torque transfer linkage 420 may be configured such that it does not resist movement of the wing section 410 any more than necessary (i.e., any more than friction between parts), which may be accomplished by orienting the respective single degrees of rotational freedom of the first pivot connection, the second pivot connection and the third pivot connection in parallel with the hinge pivot axis 506. If desired, shock absorbers, springs, travel stops, or other suspension features may be added to the torque transfer linkage 420.

The relative elevations of the pivot connections 512, 514, 516 can vary (e.g., the second pivot connection 514 may be above or below one or both of the other pivot connections), and the linkage is not required to be symmetrical. The orientation of the links 508, 510 could be downward, such as shown, or upward if such configuration is found to be more advantageous to the overall header design.

The orientation of the pivot connections 512, 514, 516 makes the torque transfer linkage 420 resist torsional loads exerted between the wing section 410 and the center section 402 because they do not allow relative rotation in the direction of the torsion force. This improves the torsional resistance of the frame in several ways. First, the linkage inhibits the wing section upper frame 412 from moving forward relative to the center section upper frame 404 (i.e., forward translation in a horizontal plane). Second, the linkage inhibits the wing section upper frame 412 from rotating relative to the wing section upper frame 404 in plan view (i.e., about a vertical rotation axis). Third, the linkage inhibits the wing section upper frame 412 from rotating relative to the wing section upper frame 404 in side elevation view (i.e., about a horizontal rotation axis extending in the lateral direction).

Figure 7:
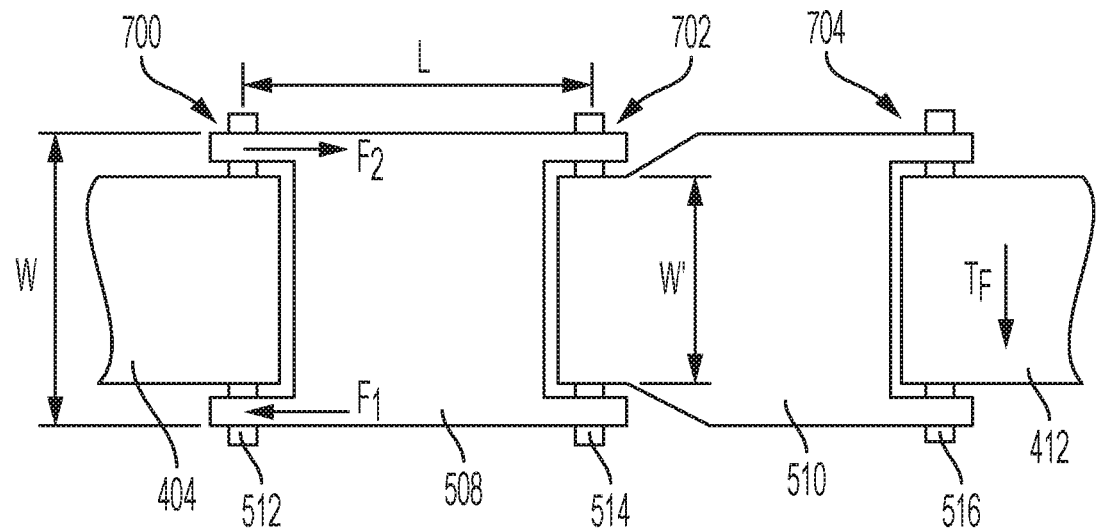
FIG. 7 is a schematic view of a torque transfer linkage and associated parts.

The effectiveness of the torque transfer linkage 420 depends on various factors, including the geometry of the parts. Referring to FIG. 7, an exemplary torque transfer linkage 420 is schematically illustrated in top plan view. Here, the first link 508 is formed as a first clevis 700 (i.e., two spaced arms that receive a pin connector) at the first pivot connection 512, and a second clevis 702 at the second pivot connection 514. The second link 510 is formed as a clevis 704 at the third pivot connection. However, the second link 510 is formed as a single body at the second pivot connection 514 (this is in contrast with FIGS. 4-6, which show the second link 510 being formed with a clevis at the second pivot connection 514, which is another optional shape). The center section upper frame 404 and wing section upper frame 412 are also shown as single bodies, but these may be formed as clevises as well. In this embodiment, the first pivot connection 512, second pivot connection 514 and third pivot connection 516 are all formed as double-shear pivot connections. That is, the load acting across the pin portion of each pivot connection generates shear loads at two locations (i.e., at each location where the pin joins the two adjacent components).

To this end, the links 508, 510 may be constructed with particular geometries that are expected to provide improved torque transferring capability. For example, each link 508 may be described as having an operative length L and an operative width W. The operative length is the distance between the attached pivot connections as measured at the respective rotation axes of the pivot connections. Thus, the operative length L of the first link 508 is the distance between the first pivot connection 512 and the second pivot connection 514, and the operative length L of the second link 510 is the distance between the second pivot connection 514 and the third pivot connection 516. In each case, the location of the pivot connection 512, 514, 516 is measured at its rotation axis. The operative width W is measured as the distance between the most distant force-reacting surfaces at the respective pivot connection. For example, at the first pivot connection 512, the operative width W is measured at the outer faces of the clevis, assuming that the clevis bearing surfaces (e.g., bushings or bearing) terminate at the outer faces. If the clevis has bearing surfaces that stop short of the outer faces, then the operative width W would be less (i.e., to the outer faces of the bearing surfaces) due to the fact that the bearings surfaces provide the force-reacting capability of the connection. The operatives widths W of the links 508, 510 at the second pivot connection 514 and third pivot connection 516 would be measured the same way. For example, the operative width of the second link 510 at the second pivot connection 514 would be the distance W' between the outer faces of the single body formed at that end.

The particular geometry of the operative length and operative width can optimized using conventional testing methods, such as finite element modeling or empirical testing. Factors that might be considered when developing the geometry may include (but do not require) the amount of rotation required by the lower frame hinge without locking up, and the desired motion resistance between the upper frame members. In general, it is expected that increasing the operative width in plan view will improve bending resistance in the fore-aft direction and making the links both wider and taller will improve shear resistance in the fore-aft direction, and increasing the polar moment of the links will improve torsion resistance.

Figure 8:
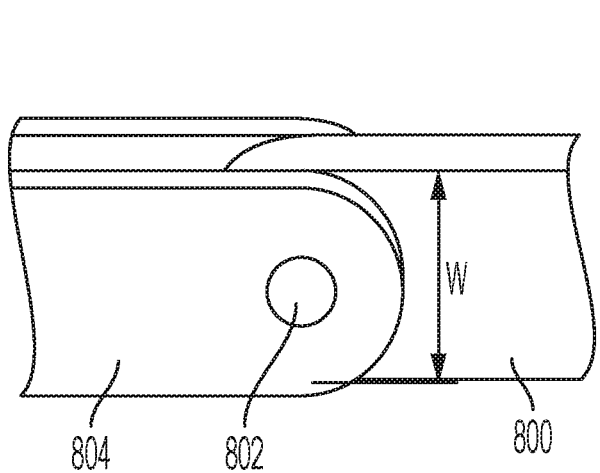
FIG. 8 is a schematic view of a portion of another embodiment of a torque transfer linkage.

While the foregoing configuration is expected to decrease droop at the ends of the wing sections 410, other embodiments may use different types of torque-transferring linkage. For example, the double-shear connections may be enhanced by adding additional shear paths, such as by forming them with additional plates in the form of a piano hinge or the like. For purposes of this disclosure, a double-shear connection includes connections that have additional connections (e.g., a quadruple-shear connection). As another example, shown in FIG. 8, the link 800 may be relatively narrow along the axis of the pivot connection 802, but the link 800 and the adjacent upper frame 804 or link may be shaped with large surfaces that abut one another in a plane perpendicular to the pivot connection axis, to thereby define a relatively large surface for transferring torque. It will also be understood that it is not strictly necessary for all or even any of the pivot connections to be a double-shear connection. A sufficiently robust single-shear connection can effectively transfer torque, particularly if the pin is relatively large in diameter and long along the rotation axis. Thus, single-shear pivot connections may be substituted for the foregoing double-shear pivot connections. Other alternatives and variations will be apparent to persons of ordinary skill in the art in view of the present disclosure.

Figure 9:
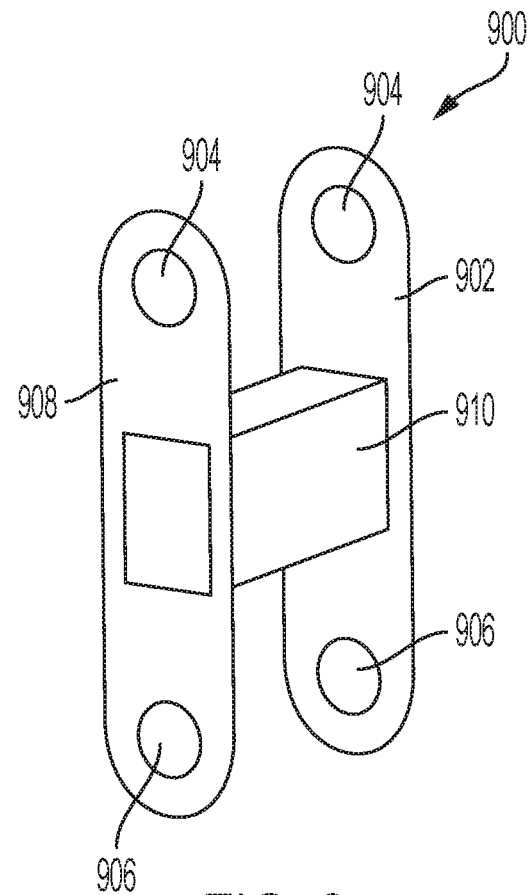
FIG. 9 is an isometric view of a link for a torque transfer linkage.

The links of the torque transfer linkage 420 may have any suitable construction. One exemplary construction is shown in FIG. 9. Here, a link 900 for a torque transfer linkage 420 has a first link arm 902 extending from a first pivot connection 904 to a second pivot connection 906, and a second link arm 908 extending from the first pivot connection 904 to the second pivot connection 906. The link arms 902, 908 may be completely separate, but more preferably they are connected by a link body 910. The link body 910 adds stiffness to the link 900, and can help increase the overall torque transferring capability of the torque transfer linkage 420. The link arms 902, 908 and link body 910 may be formed from welded plates and/or folded sheet metal, a bolted-together assembly of parts, partially or completely from cast metal, and so on. Other alternatives and variations will be apparent to persons of ordinary skill in the art in view of the present disclosure.

It has been found that adding a torque transfer linkage to a wing section of a multi-segment header provides significantly less wing section droop. For example, the deflection of the wing sections at their lateral ends can be reduced by over 10% as compared to an identical header lacking the torque transfer linkage. Furthermore, the torque transfer linkage helps mitigate the appearance of a distinct drop in the cutter bar assembly at the location where the center section transitions to the wing sections.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural vehicle header comprising:
 a center section having a center section upper frame and a center section lower frame;
 a first wing section having a first wing section upper frame and a first wing section lower frame;
 a first hinge connecting the center section lower frame to the first wing section lower frame; and
 a first torque transfer linkage connecting the center section upper frame to the first wing section upper frame, the first torque transfer link comprising:
  a first link,
  a second link,
  a first pivot connection joining the first link to the center section upper frame, and providing a respective single degree of rotational freedom between the first link and the center section upper frame,
  a second pivot connection joining the first link to the second link, and providing a respective single degree of rotational freedom between the first link and the second link, and
  a third pivot connection joining the second link to the first wing section upper frame, and providing a respective single degree of rotational freedom between the second link and the first wing section frame.

2. The agricultural vehicle header of claim 1, wherein one or more of the first pivot connection, the second pivot connection and the third pivot connection comprises a double-shear pivot connection.

3. The agricultural vehicle header of claim 1, wherein the first pivot connection, the second pivot connection and the third pivot connection all comprise respective double-shear pivot connections.

4. The agricultural vehicle header of claim 1, wherein the second pivot connection is positioned lower than the first pivot connection and the third pivot connection when the header is configured for use.

5. The agricultural vehicle header of claim 1, wherein the first hinge is configured to allow the first wing section to rotate relative to the center section about a pivot axis, and the respective single degrees of rotational freedom of the first pivot connection, the second pivot connection and the third pivot connection are parallel with the pivot axis.

6. The agricultural vehicle header of claim 1, wherein the first link comprises:
 a first link arm extending from the first pivot connection to the second pivot connection;
 a second link arm extending from the first pivot connection to the second pivot connection, the second link arm being spaced from the first link arm; and
 a link body joining the first link arm to the second link arm.

7. The agricultural vehicle header of claim 1, wherein the first link comprises a first clevis at the first pivot connection, and a second clevis at the second pivot connection, and the second link comprises a third clevis at the third pivot connection.

8. The agricultural vehicle header of claim 7, wherein the second link comprises a clevis at the second pivot connection.

9. The agricultural vehicle header of claim 1, further comprising:
- a second wing section having a second wing section upper frame and a second wing section lower frame;
- a second hinge connecting the center section lower frame to the second wing section lower frame;
- a second torque transfer linkage connecting the center section upper frame to the second wing section upper frame, the second torque transfer link comprising:
  - a respective first link,
  - a respective second link,
  - a respective first pivot connection joining the respective first link to the center section upper frame, and providing a respective single degree of rotational freedom between the first link and the center section upper frame,
  - a respective second pivot connection joining the respective first link to the respective second link, and providing a respective single degree of rotational freedom between the respective first link and the respective second link, and
  - a respective third pivot connection joining the respective second link to the second wing section upper frame, and providing a respective single degree of rotational freedom between the respective second link and the second wing section frame.

10. An agricultural vehicle comprising:
- a chassis configured for movement on a surface;
- a header mounted to the chassis, the header having:
  - a center section having a center section upper frame and a center section lower frame;
  - a first wing section having a first wing section upper frame and a first wing section lower frame;
  - a first hinge connecting the center section lower frame to the first wing section lower frame; and
  - a first torque transfer linkage connecting the center section upper frame to the first wing section upper frame, the first torque transfer link comprising:
    - a first link,
    - a second link,
    - a first pivot connection joining the first link to the center section upper frame, and providing a respective single degree of rotational freedom between the first link and the center section upper frame,
    - a second pivot connection joining the first link to the second link, and providing a respective single degree of rotational freedom between the first link and the second link, and
    - a third pivot connection joining the second link to the first wing section upper frame, and providing a respective single degree of rotational freedom between the second link and the first wing section frame.

11. The agricultural vehicle of claim 10, wherein one or more of the first pivot connection, the second pivot connection and the third pivot connection comprises a double-shear pivot connection.

12. The agricultural vehicle of claim 10, wherein the first pivot connection, the second pivot connection and the third pivot connection all comprise respective double-shear pivot connections.

13. The agricultural vehicle of claim 10, wherein the second pivot connection is positioned lower than the first pivot connection and the third pivot connection when the header is configured for use.

14. The agricultural vehicle of claim 10, wherein the first hinge is configured to allow the first wing section to rotate relative to the center section about a pivot axis, and the respective single degrees of rotational freedom of the first pivot connection, the second pivot connection and the third pivot connection are parallel with the pivot axis.

15. The agricultural vehicle of claim 10, wherein the first link comprises:
- a first link arm extending from the first pivot connection to the second pivot connection;
- a second link arm extending from the first pivot connection to the second pivot connection, the second link arm being spaced from the first link arm; and
- a link body joining the first link arm to the second link arm.

16. The agricultural vehicle of claim 10, wherein the first link comprises a first clevis at the first pivot connection, and a second clevis at the second pivot connection, and the second link comprises a third clevis at the third pivot connection.

17. The agricultural vehicle of claim 16, wherein the second link comprises a clevis at the second pivot connection.

18. The agricultural vehicle claim 10, wherein the header further comprises:
- a second wing section having a second wing section upper frame and a second wing section lower frame;
- a second hinge connecting the center section lower frame to the second wing section lower frame;
- a second torque transfer linkage connecting the center section upper frame to the second wing section upper frame, the second torque transfer link comprising:
  - a respective first link,
  - a respective second link,
  - a respective first pivot connection joining the respective first link to the center section upper frame, and providing a respective single degree of rotational freedom between the first link and the center section upper frame,
  - a respective second pivot connection joining the respective first link to the respective second link, and providing a respective single degree of rotational freedom between the respective first link and the respective second link, and
  - a respective third pivot connection joining the respective second link to the second wing section upper frame, and providing a respective single degree of rotational freedom between the respective second link and the second wing section frame.

19. The agricultural vehicle of claim 10, further comprising a threshing and separating system mounted to the chassis, and wherein the center section is operatively connected to the threshing and separating system by a feeder housing.

* * * * *